M. IMAMURA.
AUTOMATIC VEHICLE BRAKE.
APPLICATION FILED JULY 26, 1913.
1,123,538.
Patented Jan. 5, 1915.
2 SHEETS—SHEET 2.
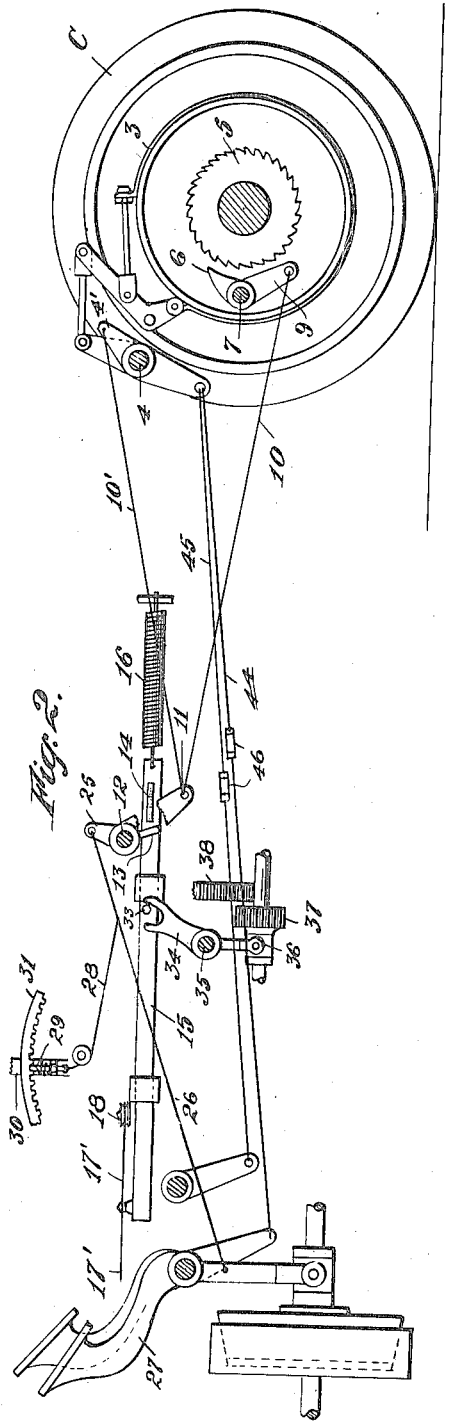
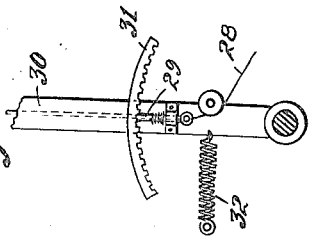
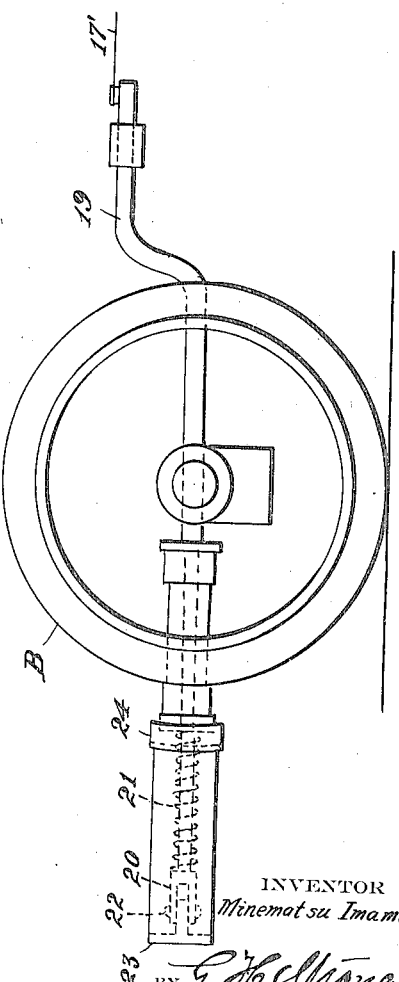
WITNESSES:
INVENTOR
Minematsu Imamura
BY G. H. Strong
ATTORNEY

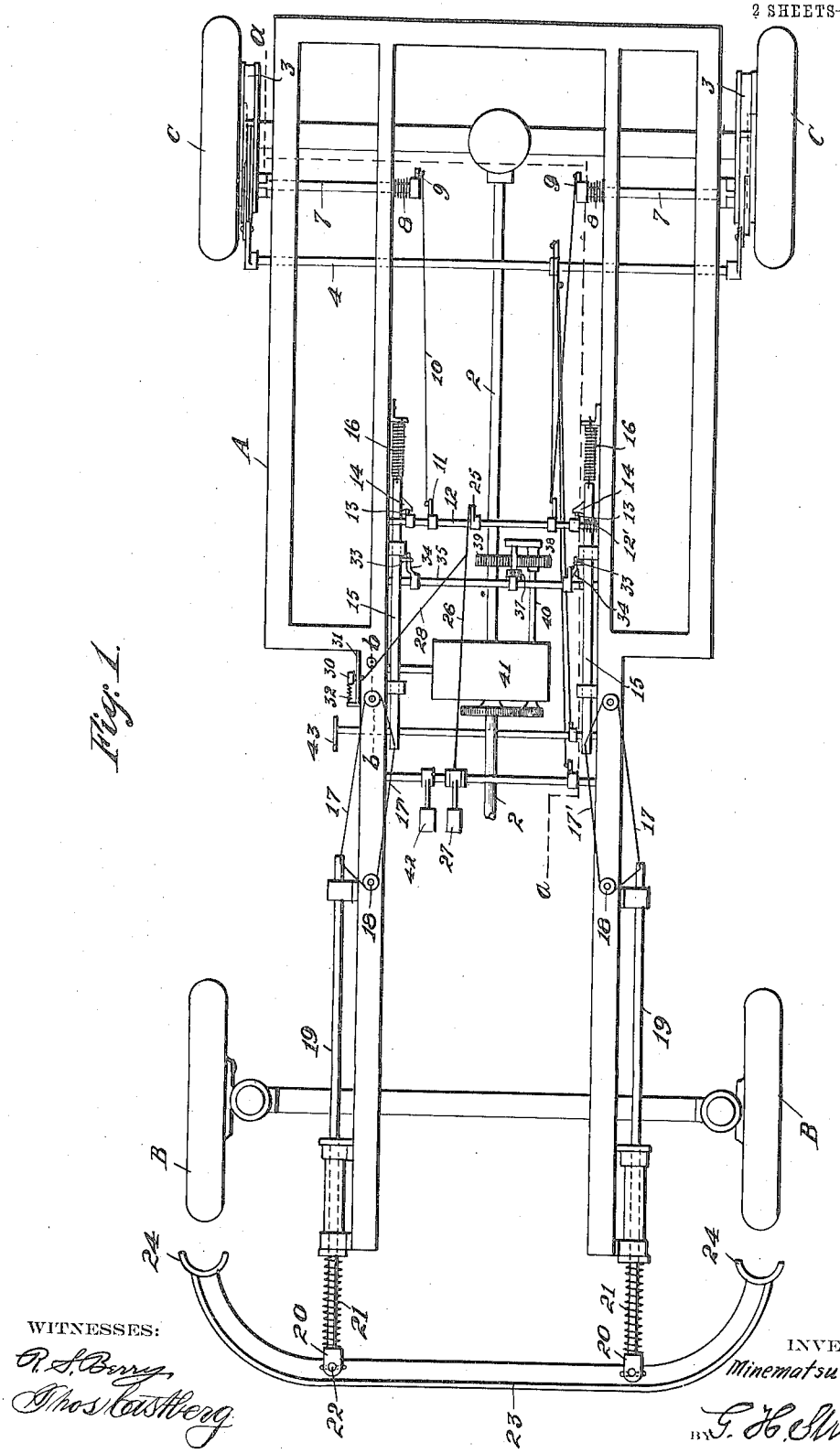

UNITED STATES PATENT OFFICE.

MINEMATSU IMAMURA, OF SAN FRANCISCO, CALIFORNIA.

AUTOMATIC VEHICLE-BRAKE.

1,123,538.

Specification of Letters Patent.

Patented Jan. 5, 1915.

Application filed July 26, 1913. Serial No. 781,231.

*To all whom it may concern:*

Be it known that I, MINEMATSU IMAMURA, a subject of the Emperor of Japan, residing at the city and county of San Francisco and State of California, have invented new and useful Improvements in Automatic Vehicle-Brakes, of which the following is a specification.

This invention relates to a combined vehicle brake and fender.

It is the object of this invention to provide means by which the fender on a power-propelled vehicle will operate when striking an obstacle to automatically apply the brakes, throw out the clutch and transmission mechanisms and momentarily reverse the vehicle.

A further object is to so mount the fender that it will operate to perform the above-enumerated functions when striking an object adjacent to its ends equally as well as when striking an object intermediate its ends.

Other objects will appear hereinafter.

The invention primarily resides in a fender pivoted adjacent to its ends on parallel slidable rods which are maintained in a normal outermost position by spring connections to each of said rods whereby the independent or combined movement of the rods will operate to simultaneously apply the brakes and throw out the clutch and transmission mechanisms to stop the vehicle and immediately thereafter release the brakes and slightly reverse the vehicle.

The invention further consists of the parts and the construction and combination of parts as hereinafter more fully described and claimed, having reference to the accompanying drawings, in which—

Figure 1 is a plan view of the invention. Fig. 2 is a detail section and elevation on the line a—a of Fig. 1, with parts removed. Fig. 3 is a detail side elevation of the forward end of the vehicle, illustrating the manner of mounting the fender. Fig. 4 is an enlarged detail section on the line b—b of Fig. 1, illustrating the device by which the transmission mechanism is automatically restored to normal by this invention.

In the drawings A represents the frame of a motor vehicle and B and C indicate the front and rear wheels, respectively, on which the frame A is mounted. The rear wheels C are designed to be rotated from any suitable source of motive power by a shaft 2 in the usual manner common to automobile construction, and are provided with ordinary band brakes 3, adapted to be operated from a rock-shaft 4.

Mounted on the rear wheels C are ratchet wheels 5, and disposed adjacent to the ratchet wheels 5 and normally out of contact therewith are pawls 6, mounted on shafts 7. The shafts 7 are disposed in the frame A of the vehicle and torsion springs 8 are mounted thereon in such manner as to normally maintain the pawls 6 out of engagement with the ratchets 5, as shown in Fig. 2.

Mounted on the inner ends of the shafts 7 are cranks 9, which are connected to cables 10, leading to cranks 11, on a rock-shaft 12, supported on the frame A.

Mounted on the rock-shaft 12, adjacent to its ends, are downwardly extending pins 13, which are disposed in the path of travel of projections 14 on horizontally slidable bars 15, supported in suitable guide bearings on the frame A. The bars 15 are normally held in a retracted position by means of springs 16, and are connected at their forward ends to oppositely rove cables 17 and 17' passing around direction rollers 18, and connected to parallel slidable bars 19, arranged on the sides of the frame A in suitable bearings and extending forward thereof a suitable distance. The outer ends of the bars 19 are formed with yokes 20, and bearing between the yokes 20 and the frame A are springs 21 which normally maintain the bars 19 in their outermost position.

Pivotally connected to the yokes 20 at 22 is a fender bar 23 of any suitable construction, which is curved inwardly at its ends toward the front wheels B, and is formed with shoes 24, which are normally positioned out of contact with the wheels B and in alinement therewith.

Mounted on the rock-shaft 12 is a crank 25, to which a cable 26, leading from a clutch control lever 27, is connected, and leading from the cable 26 is a cable 28 which connects with a spring-pressed catch 29 on a transmission-operating lever 30. The catch 29 is that usually provided for maintaining the lever 30 in any desired position; the catch 29 normally engaging a toothed segment 31, a spring 32 connects with the lever 30 and is designed to operate when the catch 29 is released to restore the lever 30 to a normal central position, in which position the transmission mechanism will be thrown out in the usual manner.

Extending inwardly from the bars 15 are pins 33 which are normally disposed between the prongs of a forked arm 34, mounted on a rock-shaft 35. A yoke 36 on the rock-shaft 35 connects with a sleeve on a slidable gear 37, which gear is adapted to be moved in and out of mesh with a pair of gears 38 and 39. The gear 38 is on a shaft 40, which is geared to the shaft 2 on the driving side of the transmission gear case 41. The gear 39 is mounted on the shaft 2 on the driven side of the crank case 41.

In the operation of the invention when the fender 23 strikes an obstacle, the bars 19 are moved rearwardly in opposition to the springs 21. The bars 19 are adapted to be moved independent of each other in event the point of impact is adjacent to the ends of the fender 23; a slotted or loose connection at the pivotal points 22 being provided to permit of the arcular movement of the fender 23 when turned on either of the pivots 22. The bars 19 in moving rearwardly operate, through the cables 17 and 17', to move the bars 15 in a forward direction in opposition to the springs 16. On the initial forward movement of the bars 15 the projections 14 will engage the downwardly extending pins 13 on the rock-shaft 12; the pins 13 being advanced with the projections 14 so as to rock the rock-shaft 12 and exert a pull on the cable 10 connecting with the cranks 9 on the shafts 7, and also upon the cable 10' connecting with a crank 4' on the rock-shaft 4. This operation causes the band brakes 3 to be applied and immediately thereafter throws the pawl 6 into engagement with the ratchets 5, thereby preventing forward movement of the rear wheels C and stopping the vehicle. Simultaneous with the application of the brakes, as just described, the rocking of the rock-shaft 12 will exert a pull through the cables 26 and 28, through the medium of the crank 25, thereby throwing out the clutch mechanism, through the foot lever 27, and releasing the catch 29, so that the spring 32 will restore the hand-lever 30 and the transmission mechanism connected therewith, to their neutral position. Projections 14 will at the same time advance beyond pins 13, thereby releasing same and permitting these, with connected shaft 12, to return to normal position. Pawl 6, together with brake 3, is thus released and the engine clutch is permitted to move back into engagement. Immediately after the application of the brakes and the consequent stopping of the vehicle and just after brake is again released and the engine engaged, the pins 33 on the bars 15 will have advanced sufficiently far to engage the forward prongs of the forked arms 34, and will then operate to rock the rock-shaft 35 and cause the gear 37 to move into mesh with the gears 38 and 39, thereby reversing the direction of rotation of the drive shaft 2, and causing the vehicle to move rearward a short distance. The forked arms 34 are so constructed that the pins 33 may move out of the forks as the bars move in a forward direction; the pins 33 engaging the rear prongs of the forked arms to retract the latter to their normal position, on the backward movement of the bars 15. The bars 15 are moved to their rearward normal position by the action of the springs 16 when the fender 23 is out of contact with an obstacle; the fender 23 being restored to its normal position by the springs 21. When the fender 23 has been moved rearwardly in opposition to the springs 21, the shoes 24 will contact the peripheries of the front wheels B to retard their rotation and operate in conjunction with the brakes 3 and pawl 6 to bring the vehicle to a quick stop. The moment the bars 15 are restored to their normal position the pawls 6 will be thrown out of engagement with the ratchets 5 and the pinion 39 will be thrown out of mesh with the gears 38 and 39; the rock shaft 12 being restored to its normal position by a spring 12', and the rock-shaft 35 will be restored to its normal position by the action of the pins 33. The restoring of the shaft 12 to its normal position releases the pull from the cables 26 and 28, thereby disposing the clutch operating lever 27 and the hand-lever 30 in their normal operating positions.

The rock-shaft 4 controlling the band brakes 3 is connected to the foot-brake lever 42 and to the hand brake lever 43 through the usual rods 44 and 45, respectively, and the rods 44 and 45 are provided with link connections 46 intermediate their ends to permit of the operation of the rock-shaft 4, independent of the hand and foot brake levers.

Having thus described my invention, what I claim and desire to secure by Letters Patent, is:

1. The combination with a fender, of a pair of suitable bars on which the fender is pivotally mounted, springs for normally maintaining said fender and bars in an advanced position, a second pair of reciprocal bars connected to said first-named bars, a rock-shaft, means for rocking said rock-shaft on the reciprocation of either or both of said last-named bars, brakes on the rear wheels of the vehicle, means by which the rotation of said rock-shaft will set said brakes, means by which the rocking of said rock-shaft will throw out the clutch and transmission mechanisms on the vehicle, and means for automatically reversing the vehicle for a short distance.

2. The combination with a vehicle, of a fender mounted thereon, a pair of slidably mounted bars, to the outer ends of which the fender is secured, springs for normally maintaining said fender and bars in an advanced position, a second pair of reciprocal bars connected to said first named bars, a rock-shaft connected with the last named bars, ratchet wheels on the rear wheels of the vehicle, pawls normally out of engagement with said ratchet wheels, a second rock-shaft on which said pawls are rigidly mounted, and a connection formed between said rock-shaft and the first named rock-shaft whereby the pawls will be thrown into engagement with the ratchet wheels when the fender is depressed.

3. In a power-driven vehicle, ratchet wheels on the rear wheels of the vehicle, pawls normally out of engagement with said ratchet wheels, rock shafts on which said pawls are rigidly mounted, a master rock-shaft connected to the pawl carrying rock-shafts, a movable fender, means actuated by the fender for rocking said master rock-shaft to move the pawl into engagement with the ratchet wheels, band brakes on the rear wheels of the vehicle, and means by which the operation of the master rock-shaft will apply said band brakes.

4. In a power-driven vehicle, ratchet wheels on the rear wheels of the vehicle, pawls normally out of engagement with said ratchet wheels, rock-shafts on which said pawls are rigidly mounted, a master rock-shaft connected to the pawl carrying rock-shafts, a movable fender, means actuated by the fender for rocking said master rock-shaft to move the pawl into engagement with the ratchet wheels, band brakes on the rear wheels of the vehicle, means by which the operation of the master rock-shaft will apply said band brakes, and means operated by the master rock-shaft for throwing out the clutch and transmission mechanisms on the vehicle.

5. In a power-driven vehicle, ratchet wheels on the rear wheels of the vehicle, pawls normally out of engagement with said ratchet wheels, rock-shafts on which said pawls are rigidly mounted, a master rock-shaft connected to the pawl carrying rock-shafts, a movable fender, means actuated by the fender for rocking said master rock-shaft to move the pawl into engagement with the ratchet wheels, band brakes on the rear wheels of the vehicle, means by which the operation of the master rock-shaft will apply said band brakes, means operated by the master rock-shaft for throwing out the clutch and transmission mechanisms on the vehicle, and means controlled by the fender for momentarily reversing the direction of movement of the vehicle.

In testimony whereof I have hereunto set my hand in the presence of two subscribing witnesses.

MINEMATSU IMAMURA.

Witnesses:
JOHN H. HERRING,
W. W. HEALEY.